March 10, 1964     A. CIAVATTA     3,124,770

STRESS MEASURING DEVICE

Filed Feb. 21, 1961     4 Sheets-Sheet 1

INVENTOR.
ARMANDO CIAVATTA
BY John B. Cuningham
ATTORNEY

March 10, 1964   A. CIAVATTA   3,124,770
STRESS MEASURING DEVICE
Filed Feb. 21, 1961   4 Sheets-Sheet 2
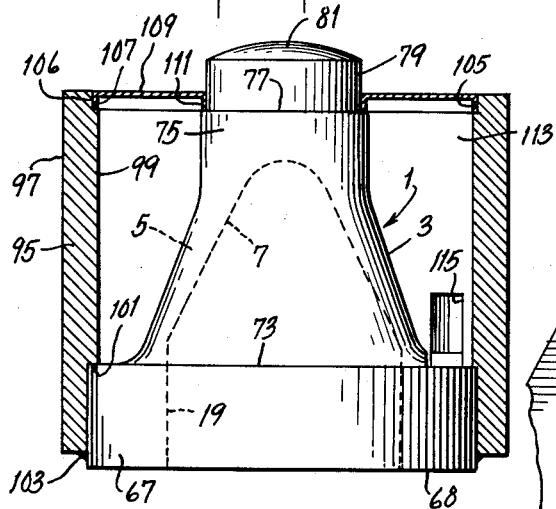
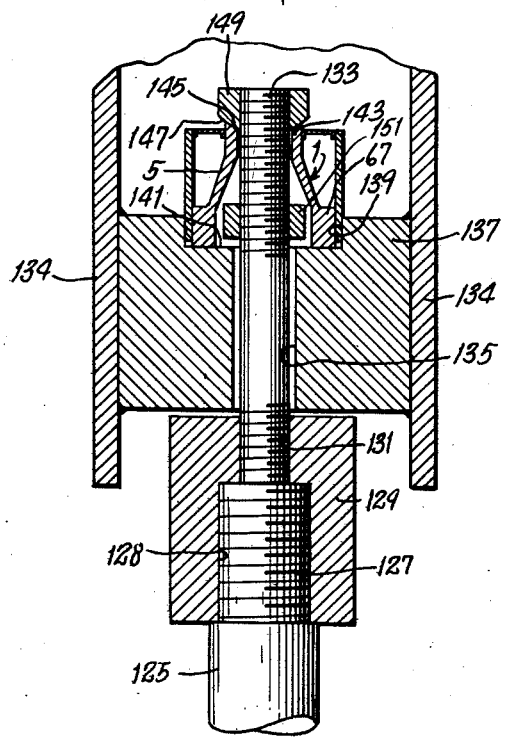
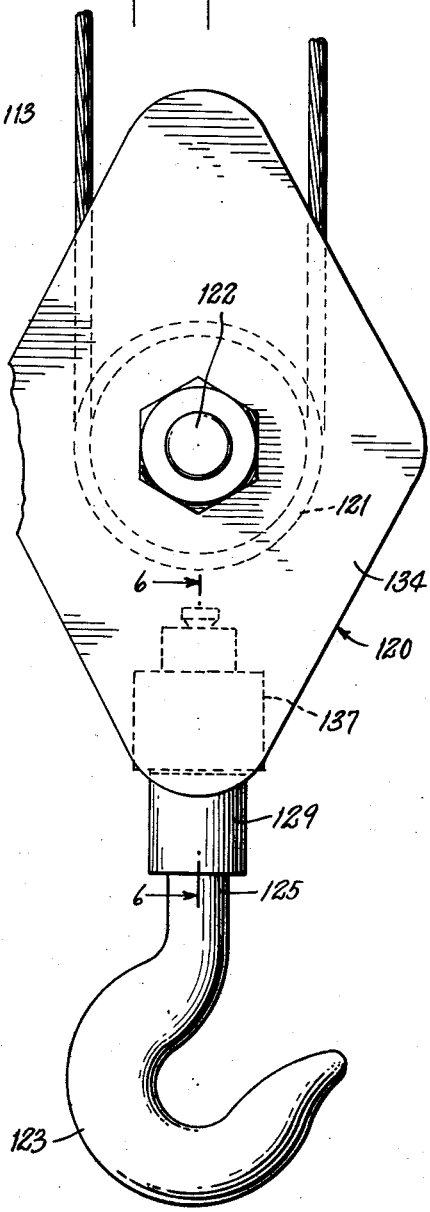
INVENTOR.
ARMANDO CIAVATTA
BY John B. Cuningham
ATTORNEY March 10, 1964  A. CIAVATTA  3,124,770
STRESS MEASURING DEVICE
Filed Feb. 21, 1961  4 Sheets-Sheet 3

INVENTOR.
ARMANDO CIAVATTA
BY John B. Cuningham
ATTORNEY

INVENTOR.
ARMANDO CIAVATTA
BY John B. Cuningham
ATTORNEY

United States Patent Office 3,124,770
Patented Mar. 10, 1964

3,124,770
STRESS MEASURING DEVICE
Armando Ciavatta, Cheshire, Conn., assignor to Revere Corporation of America, Wallingford, Conn., a corporation of New Jersey
Filed Feb. 21, 1961, Ser. No. 90,784
36 Claims. (Cl. 338—5)

This invention relates to a stress measuring device and more especially to a stress measuring device of the type broadly known as a force transducer. The invention particularly relates to a stress measuring device of the type known as a load cell adapted for measuring a load or stress applied thereto as compression or tension stress and provided with a strain element in which strain is developed under the applied stress, strain responsive means being utilized for sensing the strain together with means for quantitatively indicating this response.

Stress measuring devices of the type above described have been proposed in many forms including a single column or a plurality of columns to which the stress is applied as compression or tension lengthwise of the column. Strain elements of cylindrical annular form also have been utilized, the stress being applied thereto lengthwise of the axis of the cylinder.

One of the problems which is met in the construction and use of load cells of the types to which reference is made above is that of resisting the effect of side loads brought upon the strain element, such as a column or a cylinder, caused by application of the load or stress to the strain element at an angle to the normal line of action of the stress which the strain element is designed to receive. This side load effect also may be produced by the load or stress being applied to the strain element out of alignment or offset from the normal line of action for which the strain element is designed. Such variations from normal application of the stress may be due to non-uniform distribution of the load being tested or to other practical conditions depending upon the particular type of load which is applied to the device. To counteract the side load effects in many devices of the prior art, diaphragms or other means are utilized which, while providing for change in the longitudinal dimension of the strain element along the line of action of the stress, prevent movement thereof transverse to the line of action. Such conditions require a diaphragm or equivalent means which resists movement in its plane perpendicular to the line of action of the applied load or stress and is rigidly held against movement at the periphery of the diaphragm while also being thin enough or otherwise constructed to be flexible so that the center portion of the diaphragm will move in the line of action of the stress with the part of the strain element to which it is secured.

To avoid the difficulties of the construction to which reference has been made, it is an object of the invention to provide a stress measuring device and particularly a load cell in which, without the auxiliary means such as the diaphragm, the side load effects are neutralized so that strain is developed in the strain element substantially proportional to the stress.

It is another object of the invention to provide in a load cell a strain element of this side load compensating form which does not require a rigid enclosing structure but merely a casing for preventing access of dirt or accidental damage to the strain sensing or strain responsive means.

It is a further object of the invention to provide a strain element which is of simple form and capable of being manufactured by simple machining operations.

It is an additional object of the invention to provide a strain element for a load cell in which the strain produced along the dimension of the strain element which extends generally in the same direction as the line of stress applied thereto is substantially uniform, so that the strain sensing or strain responsive elements may be attached thereto without having to be precisely located.

It is another object of the invention to provide a strain element and a load cell structure the capacity of which may be readily modified by a simple machining operation.

To accomplish the above stated and other objects the invention utilizes a strain element of tapering form provided by an annular wall of material capable of resiliently developing strain therein, this wall extending about and being generally concentric with the line of action of the stress applied to the strain element. The wall extends about a hollow space which may be utilized for purposes hereinafter described. The essential form of the tapering strain element which provides the annular wall is that of a frustum. For simplicity and ease of manufacture preferably this frustum is one in which the exterior surface of the annular wall is conical and extends from an end portion of larger diameter or dimension about the line of action as an axis to an end portion of the smaller but substantial diameter or dimension about this axis. The material of the wall preferably is generally continuous throughout the circumferential and lengthwise extent of the wall but for certain purposes if desired recesses may be formed in the wall or openings may be made therethrough in spaced relation about the axis, provided, however, that at least in a plurality of planes transverse to the line of action of the stress the material of the wall is continuous about this line of action, these continuous portions being of such substantial extent and being connected by portions extending along the axis that the stress may be transmitted properly to the strained portions of the strain element so as to produce the requisite change in the strain responsive element or elements of suitable type attached to the wall, these strain responsive elements being connected to an indicator of suitable form and function.

Preferably, in order to transmit the stress uniformly to the various parts of the wall so that these parts will be uniformly strained, the inner surface of the annular wall is that of a paraboloid having its axis coincident with the line of action of the stress applied to the strain element. As a close approximation of the paraboloid form, however, the inner surface of the annular wall may be conical, having regard to the fact that the part of the paraboloid surface which is utilized is that which for the most part is along the length of the parabola thereof which is of less curvature and approaches a straight line. This approximation may be used because of the frusto-conical form in which the smaller diameter of the frustum is substantial with respect to the larger diameter thereof.

It will be understood where a paraboloid surface is utilized for the inner surface, a conical surface being provided for the exterior surface of the annular wall, that the thickness of the wall will vary at different portions thereof along the line of action of the applied stress. With a given thickness of the annular wall at the end thereof of larger dimension and utilizing a paraboloid surface which at the larger end of the wall is tangent to a surface which is spaced from and parallel to the exterior surface of the wall, the wall thickness will increase in the portions thereof disposed further toward the smaller diameter of the annular wall. This will occur because of the increasing curvature of the parabola as it approaches the intersection with its axis. By thus providing a wall of increasing thickness along the wall in the direction from the larger diameter thereof to the smaller diameter thereof, it is found that the strain which is developed in the strain element under the stress will be substantially uniform and equal in all planes transverse to the line of action of the stress along the length of the strain element. This makes it possible to place the strain responsive element of whatever type at any suitable location along the length of the annular wall, thus avoiding, on the one hand, the need of precise location of the strain responsive element with respect to the length of the wall and, on the other hand, making it possible to place a plurality of strain sensing elements or a plurality of sets thereof upon this annular wall to secure a plurality of indications on indicators placed, for example, at different localities. In the strain element of the invention, therefore, the so-called Poisson effect is substantially cancelled out.

Where the inner surface of the annular wall is conical, as above mentioned, the variation in the thickness of the wall may be secured with effective stress transmission and strain development of desired uniformity if the apex angle of the cone of the inner surface of the wall is greater than the apex angle of the cone of the exterior surface of the wall in sufficient degree. Where the inner conical surface approximates the surface of a paraboloid, sufficiently uniform distribution of the strain may be secured so that the advantages above mentioned as to avoidance of the precise location of the strain responsive elements and the utilization of a plurality of these elements may be secured. Moreover, while it is within the scope of manufacturing methods to machine the inner surface of the annular wall to provide a paraboloid and, by using forming tools of different parabolic shape to form this paraboloid with different contours, the inner surface may be readily formed as the surface of a cone and the thickness of the wall and the apex angle of this cone may be determined by simple conventional machining operations on machine tools without the necessity of providing special forming tools. This makes it possible readily to change the form of the annular wall of the strain element for changing the capacity and the uniformity of strain effect and, therefore, or response by the strain responsive element or "strain gauge."

The strain responsive elements may be of any suitable type. Usually the strain responsive element or "strain gauge" is of the electrical impedance type, a plurality of these strain gauges being mounted on the annular wall, ordinarily in symmetrical relation about the axis, and connected in an electrical circuit, usually a bridge circuit provided with an electrical indicator or galvanometer to indicate the strain effect. These strain gauges, however, may be provided as electrical resistances, or as semiconductors, produced by any suitable conventional methods and secured to the strain element by any suitable conventional means.

For application of the stress or the load a stress applying means is utilized and for resisting the stress transmitted through the strain element a stress resisting means is provided which is capable of cooperating with the tapering strain element of the invention. As will be understood more clearly from the description taken in connection with the drawings, the stress or load applying means and the stress resisting means may be separate from but preferably are formed integrally with the tapered strain element having the features above described. The mass of the stress applying means and of the stress resisting means may be made such that the deformation thereof is slight or negligible so as not to modify the application of the stress to the strain element and the transmission thereof through the strain element to the stress resisting means to any undesirable extent.

Other objects and features of the invention will be understood from the description to follow taken in connection with the drawings in which:

FIG. 4 shows a load cell with a casing of further modified form;

FIG. 5 shows in elevation a crane hook and block in which a load cell similar to that of FIG. 4 is supported for measuring the load;

FIG. 6 is a section taken on line 6—6 of FIG. 5;

Figure 1:
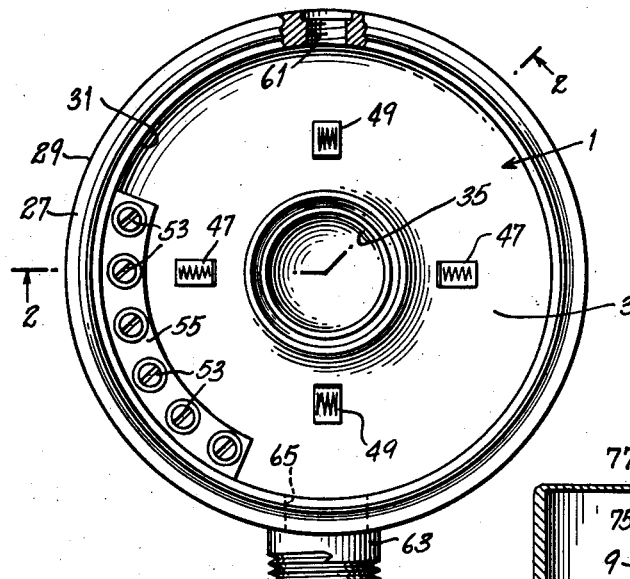
FIG. 1 is a top view of a load cell embodying the invention.
Figure 2:
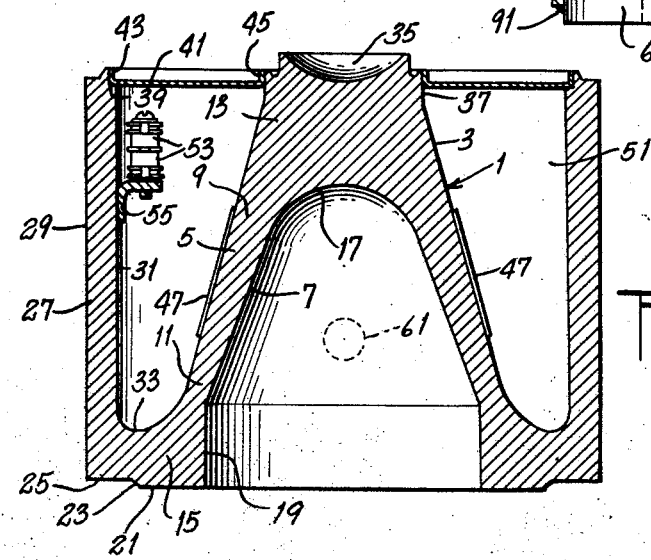
FIG. 2 is a section on line 2—2 of FIG. 1.

In FIGS. 1 and 2 the strain element 1 is of the form providing an exterior conical surface 3, the axis of this surface being coincident with the normal line of action of the stress applied to the strain element. In this strain element an annular wall 5 is defined between the exterior conical surface 3 and an inner surface 7. In this embodiment the surface 7 also is that of a cone the axis of which is coincident with the line of action of the stress as normally applied to the strain element. The apex angle of the cone formed between the linear elements of the conical surface 3, if extended to the axis, is less than the apex angle of the conical surface 7. The annular wall 5, therefore, is of greater thickness at its upper part 9 in FIG. 2 than at the lower part 11 thereof. The part 9 of the annular wall that is of greater thickness is of less diameter and of less peripheral extent about the axis than the part 11 of less thickness which is of greater diameter and greater peripheral extent about the axis. The conical strain element thus is a frustum of annular form about the line of action of the stress.

As has been stated, the thickness of the annular wall may vary along the inclined length thereof, or generally along the axis and the line of action of the stress, in such a manner as to secure substantially uniform strain in the strain element at different points spaced along the length thereof. In the embodiment of FIGS. 1 and 2 the portions 9 and 11 of the annular wall are integrally connected respectively to a stress applying portion 13 and to a stress resisting portion 15 of the load measuring device.

Because of their form as surfaces of revolution, the exterior conical surface 3 and the interior conical surface 7 may be produced by a turning operation in a machine tool, a forming tool or other conventional means being used to form the arcuate surface 17 having a contour which tangentially connects the rectilinear elements of the conical inner surface 7. By a turning operation also other surfaces of the strain element and of its stress applying and its stress resisting portions may be produced. Thus, the inner surface 19 of the stress resisting portion 15 which is cylindrical in the embodiment of FIGS. 1 and 2 may be produced in a turning operation and the bottom surface 21 of the portion 15 also may be produced by a facing or turning operation. As shown in FIG. 2 the surface 21 is planar and perpendicular to the axis so as to rest on a suitable bearing surface for supporting the load cell in position to take the stress over an annular area between the cylindrical bore 19 and a shoulder 23 formed between the surface 21 and an offset surface 25. In this embodiment a casing wall 27 also is integral with the portion 15 and provides an annular wall defined by outer cylindrical surface 29 and inner cylindrical surface 31 upon the axis of cones. The outer surface 29 extends downwardly to the offset surface 25 and the inner cylindrical surface 31 is connected tangentially to arcuate surface 33 which connects tangentially to the outer conical surface 3.

At the upper side of the stress applying portion 13 this portion in this embodiment is formed with a concave surface 35 which may be spherical, the axis of the sphere being coincident with the line of application of the stress and with the common axis of the cones. The concave surface may be of conventional size and contour to suit a conforming member of the load structure, so that the load or stress will be applied at the center of the upper stress applying portion 13 of the strain element and so as to be directed generally along the axis of the cones.

The stress applying portion 13 also is formed at its upper part with a cylindrical exterior surface 37 upon the axis of the cones. The upper end of the annular wall 27 is provided with an annular shoulder 39 extending about the axis of the cones. A closure 41, which may be of sheet metal die formed with flanges to the shape shown and so as to have an outer diameter adapted to fit to the wall 27 and against the shoulder 39, is pressed into place with the upwardly extending flange 43 thereof against the vertical surface of the wall 27 adjacent the shoulder 39. The inner flange 45 of the closure extends about an opening in the closure which receives the cylindrical surface 37, the flange 45 fitting against this surface 37. The proportions and fit of the closure 41 and its flanges 43 and 45 with respect to the annular wall 27 and the cylindrical surface 37 are such as to retain the closure in place and prevent access of dirt and dust to the space between the wall 27 and the strain element 1 without providing, as is the case with certain prior art devices, for the closure 41 to function as means for taking up and resisting side load effects, that is, the stresses due to the application of the load somewhat at an angle to or somewhat offset from the normal line of action that in the present device is coincident with the axes of the cones.

The side load effects, as has been indicated in the general description set forth above, are neutralized, or compensation is provided for these effects, by virtue of the tapered frustum form of the strain element of the invention. It has been found that the strain element of this form will transmit the stress received by the stress applying portion 13 from this portion through the strain element to the stress resisting portion 15 substantially uniformly about the axis of the frustum, so that the strain responsive elements or "strain gauges" may be disposed about the axis without the necessity of very precise location. Moreover, when the annular wall is made with a varying thickness increasing from the part thereof which is of large diameter to the part thereof which is of smaller diameter, the variation in the thickness of the wall may be made such that the strain is uniform in the several portions of the annular wall that are disposed in planes perpendicular to the axis and spaced along this axis. Thus, the strain gauges are not required to be disposed in precisely located positions along the axis of the cones and they may be disposed in different positions along and about the wall without distorting the indication of the strain. This feature also makes it possible to dispose the gauges not only in spaced relation in a single series or set about the axis of the cones without precise location or spacing but also in a plurality of sets about the axis in interspersed relation. Moreover, a plurality of tiers or rows that are spaced along the axis, that is, along the inclination of the annular wall, may be used each containing a set or a plurality of sets of gauges, without the need of precise spacing or location in the direction along the axis or along the wall.

Figure 3:
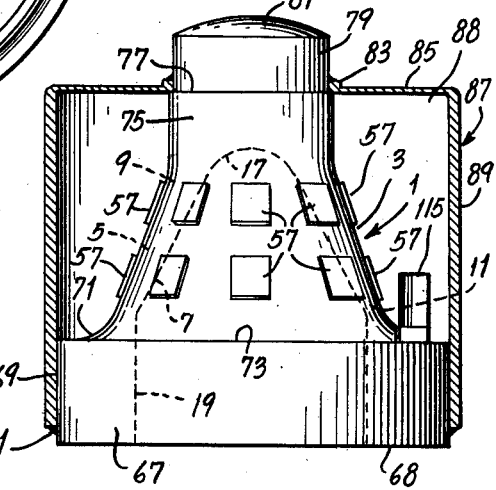
FIG. 3 shows in section a load cell similar to that of FIGS. 1 and 2 but with a modified enclosing casing.

By way of example such a plurality of strain gauges is shown in FIG. 3 in a simple pattern. In this figure in each of the two tiers or rows eight strain gauges 57 are disposed about the axis on the conical surface 3. It will be understood that, in groups of four in each row or tier, alternate strain gauges may be connected in a bridge circuit in the conventional manner. Thus, in the pattern of FIG. 3, a plurality of these bridge circuits may be formed and indications of the same value of the strain produced may be shown on the indicators thereof at different locations or for different purposes where a plurality of indications is desired. In the embodiment of FIGS. 1 and 2 only four strain gauges 47 and 49 are secured on the outer conical surface 3 in a conventional manner so as to be responsive to the strain produced in the strain element 1 but additional gauges may be disposed in the manner shown in FIG. 3 and as described.

The space 51 of annular form about the conical surface 3 and within the wall 27, FIG. 2, may be utilized for the disposition of resistors 53 which may be supported, for example, upon and secured to a shelf 55 which may be fastened by any suitable means to the wall 27, these resistors being connected in the circuit in any conventional manner suitable for the purpose.

The wall 27 may be provided with a threaded opening 61 for connection thereto of a fluid carrying conduit for the purpose of conducting cooling or heating fluid into the annular space 51. A plurality of such openings may be utilized if it is desired to provide for flow of the fluid through this space. A connector 63 of suitable type for connecting an electric conduit or the like may be secured by conventional means to the wall 27 and so as to close an opening 65 through this wall through which electrical conductors may be carried for connection to the strain gauges and to the resistors in a conventional manner.

FIG. 3 shows also a modification of the strain element of the invention which is of the same general form as that of FIG. 2 in providing the annular wall 5 defined between the exterior conical surface 3 and the interior conical surface 7, the arcuate end surface 17 being provided tangentially connecting the linear elements of the conical surface 7. In this embodiment, however, the stress resisting base portion 67 is of annular form defined between the inner cylindrical surface 19 and an exterior cylindrical surface 69. The lower portion 11 of the annular wall 5 is integrally connected to the annular base 67, the conical surface 3 being connected by a curved surface 71 tangentially to the upper surface 73 of the base 67, so that the annular base 67 is in the form of a lower flange for the strain element 1. The upper thicker part 9 of the annular wall 5 is integrally connected to a load or stress applying portion 75 of cylindrical form, a shoulder 77 being formed with respect to an upper cylindrical part 79 which is provided with a convex spherical end surface 81 for receiving the load to be applied to the strain element. The shoulder 77 and the cylindrical surface of the part 79 are adapted to receive in bearing engagement an annular hub portion 83 of a transverse wall 85 of a casing 87 having a cylindrical wall 89 integral with the wall 85. The inner diameter of the wall 89 closely engages the exterior surface 69 of the base 67 to which it may be welded at the end 91 of the wall 89. The hub portion 83 also may be welded, as shown in FIG. 3, to the upper cylindrical part 79 of the stress applying means.

The casing 87, by virtue of the conical form of the strain element 1, is not required to compensate for or to counteract side load effects but provides a closure or casing for protecting the strain gauges 57 and the other devices which may be disposed within the casing from dirt and dust as well as from mechanical damage. It will be understood that the strain element of FIG. 3 carrying its casing 87 may be placed with the bottom surface 68 of the annular base 67 upon a suitable conforming surface of a support, so that the stress carried through the strain element 1 from the stress applying portions 75, 79 to the stress resisting base 67 may be resisted and, accordingly, strain may be developed in the strain element 1.

The strain element thus will function in a manner similar to that described in connection with FIGS. 1 and 2.

FIG. 4 shows a load cell having a strain element 1 similar to that of FIG. 3. In this embodiment, however, the casing is provided by an annular wall 95 defined between a cylindrical surface 97 and an inner cylindrical surface 99. The wall 95 in its lower portion is shouldered at 101 to bear upon the upper surface 73 of the base 67, the lower end of this wall being welded at 103 to the base 67.

The upper end portion of the wall 95 is formed with a shoulder 105 with respect to a cylindrical surface 106 to which the outer downwardly turned flange 107 of an annular closure disc 109 is snugly fitted, this closure disc having an inner downwardy turned flange 111 which bears against the shoulder 77 of the stress applying portion 75 and against the cylindrical surface 79, as in FIG. 3. The wall 95 and the annular closure 109 serve to close the annular space 113 within the wall 95 similarly to the closures of FIGS. 2 and 3. The load may be applied to the surface 81 and transmitted through the strain element 1 to the base 67 in a manner similar to that described in connection with FIG. 3 without side load on the closure 109.

In FIGS. 3 and 4 an opening 115 is provided in the wall 89, 95 for bringing in the electrical leads for the strain gauges or for other purposes of access to the annular spaces 88, 113 in FIGS. 3 and 4.

FIGS. 5 and 6 show a conventional hoist block 120 supporting pulley 121 on a stud shaft 122. The hook 123 disposed below the block 120 is provided with shank 125 having a threaded end 127 which is screwed into a threaded opening 128 in a member 129, this member 129 also having a threaded hole 131 coaxial with the threaded opening 128 in which a stud 133 is threaded. This stud extends coaxially with the shank 125 of the hook upwardly between the plates 134 of the block 120 and through a hole 135 in a spacer and support member 137 with clearance. The member 137 is secured to the plates 134, as by welding, and is formed with a recess 139 in which a load cell similar to that of FIG. 4 is disposed, the base 67 of the strain element 1 of this load cell being disposed in bearing relation to the bottom surface 141 of the recess. In this embodiment the upper stress applying portion 143 of the strain element is of annular form extending with clearance about the stud 133 and provides at its upper end a concave spherical bearing surface 145 for engagement with the lower convex spherical surface 147 of a nut 149 which is threaded on the end of the stud 133. It will be understood that, when the load is hung on the hook 123, the stress is transmitted through the shank 125 and the threaded portion 127 and the member 129 and through the stud 133 to pull the nut 149 down upon the surface 145 so as to transmit the stress as compression to the strain element 1 and through this element to the base 67 and then to the support member 137. The stress thus is carried to the plates 134 of the block 120 and thence to the pulley 121 and the supporting cable. The annular wall 5 of the strain element 1 which, as shown, is of varying thickness along this length similarly to the embodiments of FIGS. 2, 3 and 4, will develop therein uniform strain as has been described and the strain gauges, not shown in FIG. 6, may be mounted either on the exterior conical surface of the annular wall 5 or on the inner surface thereof in a suitable arrangement or pattern for the purpose for which the load cell is used in this embodiment for the measurement of the load as tension brought upon the hoist and its hook 123.

Figure 7:
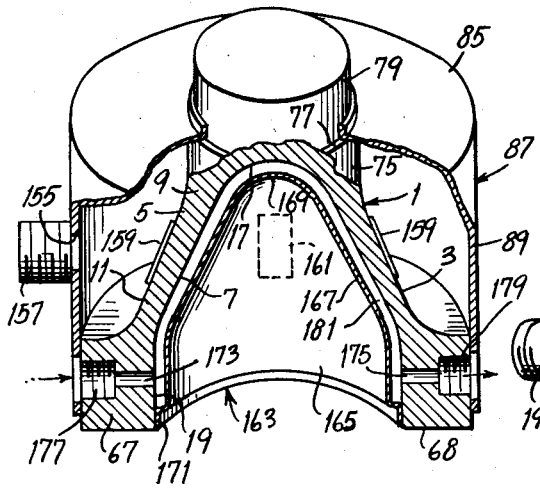
FIG. 7 shows a load cell similar to that of FIG. 3 in which means are provided for temperature control by fluid flow.

FIG. 7 shows a load cell utilizing a strain element 1 which is similar to that of FIGS. 3 and 4 in providing an annular wall 5 in the form of a conical frustum, the thickness of the wall increasing from the lower portion 11 to the upper portion 9, these portions respectively being integral with an annular base 67 and an upper load or stress applying portion 75. The load cell in this embodiment utilizes a casing 87, as in FIG. 3, having a cylindrical wall 89 and a transverse wall 85 engaging the upper part 79 and a shoulder 77 of the stress applying portion 75, as in the embodiment of FIG. 3. In the embodiment of FIG. 7 the cylindrical wall 89 is provided with an opening 155 to which a fitting 157 is connected for bringing in, for example, electrical leads for the strain gauges 159, 161 which may be mounted on the exterior surfaces 3 of the strain element in a manner similar to that of FIGS. 1 and 2. The uniform strain is developed in the strain element 1 in the manner which has been described previously.

In the embodiment of FIG. 7 within the space defined by the inner conical surface 7 and the spherical end surface 17 is disposed a member 163 of annular form having a generally cylindrical lower wall portion 165 disposed in generally parallel relation to the inner cylindrical surface 19 of the base portion 67 and an upwardly extending conical wall portion 167 generally parallel to and spaced from the inner conical surface 7 of the strain element. The member 163 at its upper end also provides a wall portion 169 contoured so as to be disposed in generally parallel relation to the surface 17 of the load or stress applying portion 75. The member 163 also is provided with a downwardly projecting outwardly offset annular flange 171 disposed in engagement with and in fluid tight relation to the cylindrical surface 19 adjacent to but not projecting beyond the bottom surface 68 of the annular base 67.

This annular base portion 67 of the strain element of the load cell of FIG. 7 is provided with an inlet opening 173 and an outlet opening 175 respectively communicating with threaded holes 177 and 179 which register with holes extending through the wall 89. The holes 177 extend only part way into the base portion 67 and are threaded for connection respectively of a fluid inlet conduit and a fluid outlet conduit. It will be apparent that a fluid may be delivered through an inlet conduit connected to the threaded hole 177 and thence through the opening 173 into the annular space 181 formed between the member 163 and the surfaces 19, 7, 17 and that the fluid may flow about the member 163 through this annular space to the opposite side of the base portion 67 where it may flow outwardly through the opening 175 and into an outlet conduit connected at the threaded hole 179. The fluid utilized may be of any suitable kind, for example, air, and it may be forced through the opening 173 into the annular space 181 to flow about this space in confined relation to the inner surface 7 of the annular wall 5 and then outwardly through the opening 175 to the outlet conduit. This fluid may be utilized either for heating or for cooling depending upon the conditions to which the load cell is subjected in order that a uniform temperature may prevail with respect to the strain element of conical frustum form so as to obviate variations in the indication of strain that may be due to variations in electrical resistance or to other causes resulting from variations in the temperature of the strain element and of the strain gauges. By suitable proportioning of the width of the annular space 181 and the disposition of the portions 165, 167, 169 of the member 163 with respect to the inner surfaces 19, 7 and 17, the flow of the fluid about the member 163 may be distributed over these inner surfaces 19, 7 and 17, and particularly with respect to the inner surface 7, so that the portion of the strain element 1 provided by the annular wall 5 upon which the strain gauges 159, 161 are mounted may be maintained at a substantially uniform temperature.

The casing 87 of the type shown in FIGS. 3 and 7 may be formed with relatively thin cylindrical wall 89 and transverse wall 85 since these walls are not required to receive or transmit any stress due to side load effects. The casing 87 of FIGS. 3 and 7, therefore, may be formed, for example, from sheet metal by any suitable mechanical method such as spinning or die forming, it being possible by such methods to secure the requisite dimensions with sufficiently close tolerance to provide for the fit to the engaged surfaces of strain element and its stress applying and stress resisting portions in the manner described.

The load cell having a casing or enclosure provided by a thicker wall, such as the wall 27 of FIG. 2 or the wall 95 of FIG. 4, may be advantageous in some cases where protection is necessary or desirable for the strain element and its strain gauges against mechanical external forces which may be brought upon the cell due to the conditions of its service.

Figure 8:
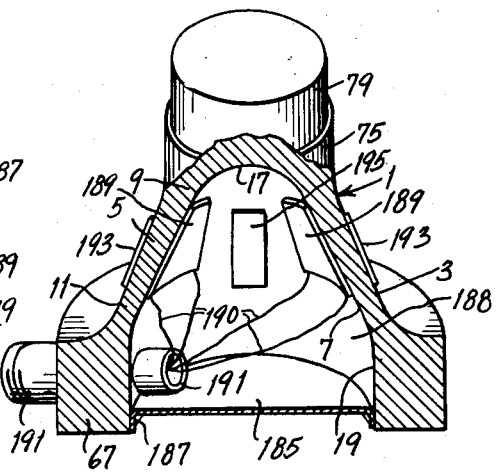
FIG. 8 shows a strain element similar to that utilized in FIGS. 3 and 4 and provided with heating means for controlling the temperature.

In FIG. 8 is shown a strain element 1 having substantially the same form as those of FIGS. 3, 4 and 7 with respect to the annular wall 5 of increasing thickness between the lower portion 11 and the upper portion 9, this strain element of frustum form being connected integrally to a base portion 67 and to a load or stress applying portion 75 similarly to the embodiments previously described. The strain element of FIG. 8 is provided with a closure 185 having a downwardly turned peripheral flange 187 engaging the inner surface 19 of the base portion 67 in close relation so as to be retained by the base portion and to close the space 188 defined within the wall 5 and within the cylindrical surface 19 and the arcuate surface 17 but so as to be removable for access to the space 188. In this embodiment, upon the inner wall surface 7 are mounted heating elements 189 which may be of electrical resistance type connected to a suitable supply by leads 190 extending through an inlet conduit 191 secured in an opening in the base portion 67. In any conventional manner the amount of current flowing through the resistance 189 may be controlled to control the heating of the wall 5 upon which the resistances 189 are mounted and to control the temperature of the air or other fluid confined in the space between the closure 185 and the annular strain element 1. To this end a thermostat, not shown, may be mounted on the wall 5 and connected to a control device. The heating elements 189 preferably will be disposed upon the inner surface 7 or adjacent thereto and in generally uniformly spaced relation about the common axis of the conical surfaces 3 and 7 of this strain element. Strain gauges 193 may be mounted on the outer surface 3 of the strain element 1, as for example in FIGS. 1 and 2, in alternate interspersed relation so as to be connectible in a conventional bridge circuit. In this embodiment, however, between the four heating elements 189 disposed adjacent the inner surface 7 may be mounted strain gauges 195 carried on the inner surface 7, only one of these strain gauges 195 being shown in FIG. 8. It will be understood that the strain element 1 of FIG. 8 and stress resisting base 67 and its stress applying portions 75, 79 may be provided with a casing of either of the types which are shown in and have been described in connection with FIGS. 3, 4 and 7.

Figure 9:
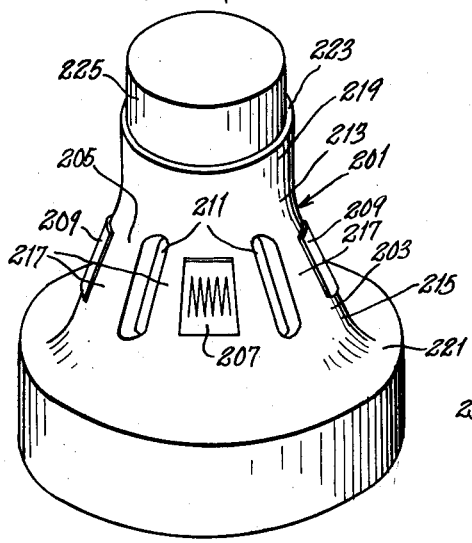
FIG. 9 shows a modification of the strain element of FIGS. 3 and 4.

FIG. 9 shows a strain element and its load or stress applying means and its stress resisting means which is similar to those of FIGS. 3, 4, 7 and 8. In the modification of FIG. 9 the strain element 201 provides an annular wall 203 having an outer conical surface 205 upon which are mounted strain gauges 207 disposed at opposite sides of the axis of the conical surface 205 and strain gauges 209 disposed at opposite sides of the axis and upon the surface 205 but in the plane perpendicular to the plane containing the strain gauges 207. Between the strain gauges 207, 209 the annular wall 203 is provided with elongated apertures 211 which make it possible to provide a strain element of low capacity without requiring the annular wall 203 to be extremely thin. In the strain element of this form the thickness of the wall 203 may be made greater because the material removed to form the apertures 211 may be added to the thickness of the portions of the wall 203 that are disposed between the apertures. The apertures 211 preferably are spaced uniformly about the axis of the strain element and may be such number, length and width that the purpose just mentioned is accomplished while still providing the features of the invention which have been described.

Accordingly, as will be seen in FIG. 9, the annular wall 203 of the strain element 201 in which the strain is developed upon application of the load or the stress provides portions 213 and 215 that are continuous about the line of action, that is about the axis of the conical surface 205, so that the strain which is developed in the strain element may be carried completely and uniformly about the axis at least in the two portions 213 and 215, to secure the uniform strain to which the strain gauges are responsive. Preferably the apertures are symmetrically disposed so that the strain gauges may be disposed symmetrically with respect to each other and to the apertures 211 which themselves may be of symmetrical outline with respect to planes containing the axis of the cone in which the respective apertures are disposed. Thus, the strain developed in the portions 217 between apertures will be uniform in respective planes that are spaced along the axis and are perpendicular to the axis. The thickness of the annular wall 203 may be uniform along the inclined length thereof but preferably is greater toward the upper part thereof of smaller diameter and in the portion 213 adjacent the stress applying portion 219 as compared with the lower part of larger diameter and in the portion 215 adjacent the stress resisting base 221. As in the embodiments of FIGS. 3, 4, 7 and 8 the strain element of FIG. 9 may provide a shoulder 223 adjacent the stress applying portion 219 for engagement by a closure or a transverse wall of a casing fitting to the upper part 225 of the strain applying portion.

Figure 10:
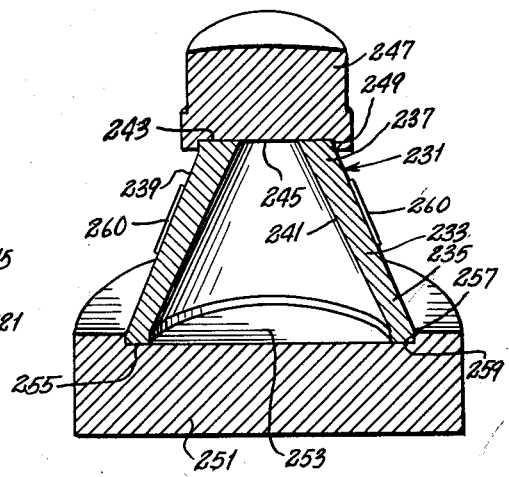
FIG. 10 shows a further modification of the strain element suitable for the load cells of FIGS. 3 and 4.

In FIG. 10 is shown a further modification of the strain element of the invention in which the part thereof in which the strain is developed to which the strain gauges are responsive is separate from, that is, not integral with the stress applying portion and the stress resisting portion. As shown in FIG. 10 the strain element 231 provides an annular wall 233 having its lower portion 235 of less thickness than its upper portion 237, the outer surface 239 of the element 231 being of conical surface and the inner surface 241 also being conical but having a greater apex angle than the apex angle of the surface 239. The element 231 is in the form of a frustum provided by the annular wall 233 the upper end surface 243 of which in this embodiment is planar and perpendicular to the common axis of the conical surfaces 239, 241, the surface 243 being engaged by a cooperating surface 245 at the bottom side of a stress applying member 247. The upper end portion 237 of the annular wall 233 has an exterior surface 249 which may be cylindrical and which engages an interior cylindrical shoulder surface of the stress applying member 247 in order that the upper smaller end portion 237 of the annular wall 233 may be confined by the peripheral part of the relatively heavy stress applying member 247 to prevent distortion of the portion 237. The stress is transmitted to the wall 233 through the contacting surfaces 245, 243 and through the annular wall to a stress resisting member 251 disposed at the bottom of the device in FIG. 10. This stress resisting member 251 provides a surface 253 which may be planar and perpendicular to the axis of the cones for engagement by a planar end surface 255 formed upon the lower larger end of the annular wall 233. This lower end portion 235 of the strain element also may be provided with a surface 257 cylindrical upon the axis of the cones and in engagement with a cylindrical inner shoulder surface 259 adjacent the surface 253, so that the lower end portion 235 of the strain element is confined by the relatively heavy member 251 against peripheral distortion when the stress is brought upon the strain element 231. The stress, however, is transmitted through the surfaces 255, 253 and the strain developed in the annular wall 233 is uniformly distributed in the annular wall 233 about the axis of the cones. The thickness of the annular wall increases between its lower end portion 235 and its upper end portion 237 in such degree that the strain is uniform along the length of the wall in the manner and for the reasons which have been set forth above in connection with the previously described embodiments. The surfaces 243, 245 and the surfaces 253, 255 may be machined with the precision attained in machining contacting surfaces in conventional load cells having, for example, a column or columns separate from the stress applying and stress resisting members.

For some purposes the device of the form shown in FIG. 10 provided with separate stress applying and stress resisting members and with a tapering annular frustum-form strain element may be preferable, having regard to the advantage which is obtained in connection with the strain element of this invention that the capacity thereof and of the load cell in which it is used may be varied by modifying the thickness of the annular wall. Thus, a set of strain elements 231 may be used having the same exterior form and dimensions in order to fit to the stress applying member 247 and the stress resisting member 251, the different strain elements having the inner conical surface 241 of greater or less diameter to provide a greater or less wall thickness, so that these strain elements may be interchanged to suit different load conditions.

Although in FIG. 10 the device is shown in three parts, namely the stress applying portion 247 and the stress resisting portion 251 with the strain element 231 disposed therebetween, the planar surfaces 243, 245 cooperating at the upper end of the strain element and the surfaces 253, 255 cooperating at the lower end thereof, the stress applying member 247 may be made integral with the upper end portion 237 of the strain element 231 while retaining the separate stress resisting member 251 and the planar surfaces 253, 255. On the other hand, the stress applying member 247 may be separate and the planar surfaces 243, 245 may be retained while the lower end portion 235 of the strain element 231 is made integral with the stress resisting member 251. In either case preferably the shoulders which peripherally confine the adjacent portions of the separate annular wall are retained in order that the strain applied to the planar surface of this wall may not be adversely modified by peripheral expansion or contraction or other distortion of this portion of the annular wall.

Figure 11:
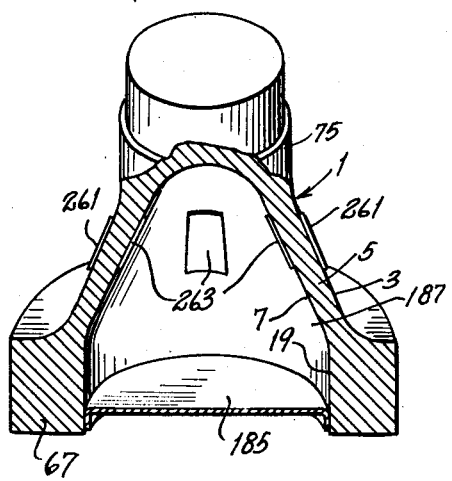
FIG. 11 shows another modification of the strain element of the invention.

FIG. 11 shows a strain element 1 similar to that of FIG. 8 and having a closure 185 closing the space within the annular wall 5, this strain element having an integral stress resisting base portion 67 and an integral stress applying portion 75. In this embodiment strain gauges 261 are mounted on the exterior conical surface 3 and strain gauges 263 are mounted on the inner conical surface 7 of the annular wall 5. Having regard to the uniformity of the strain developed in the annular wall 5 of the strain element of this invention, a plurality of strain gauges may be mounted either on the outer conical surface 3 or on the inner conical surface 7 or on both of these surfaces in a suitable distribution pattern in order that a plurality of gauges for a plurality of indications may be provided as suggested in connection with FIG. 3. The closure 185 may be fitted to the surface 19 so that this closure readily may be inserted and removed for access to the space 187 as in FIG. 8.

Figure 12:
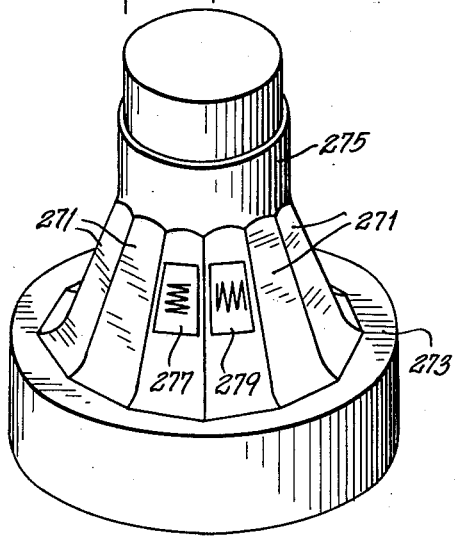
FIG. 12 shows a strain element of pyramidal form embodying the invention.

In FIG. 12 is shown a strain element embodying the invention which is of pyramidal form. In the particular embodiment shown in FIG. 12 the pyramid is provided with twelve sloping planar surfaces 271 disposed in adjacent relation to each other and about the axis of the strain element in symmetrical relation to each other and to this axis. These surfaces 271 are tangent to curved surfaces which connect to the exterior upper surface of a stress resisting base 273 and intersect the cylindrical surface of a stress applying portion 275. Upon each of the planar surfaces 271, or on selected surfaces 271 that are preferably in symmetrical arrangement about the axis, strain gauges 277 and 279 in alternate relation may be supported and connected in a conventional manner by conductor means, not shown, in a bridge circuit or to other measuring means.

The surfaces 271 together define the outer surface of the pyramid, that is, of the annular wall which constitutes the strain element of the invention. The inner surface of this annular wall also may be pyramidal form with inner planar surfaces disposed respectively in facing relation to the exterior planar surfaces 271 and in spaced relation thereto to define therebetween the wall thickness. This wall thickness, by virtue of the respective inclinations of the planar surfaces at the two faces of the wall may vary in thickness from the base 273 to the stress applying portion 275 similarly to the embodiments previously described. The inner surface, however, of the strain element of FIG. 12 may be conical about the axis of the device and of generally the same form as that of the elements of FIGS. 2 and 3 and others previously described.

As has been mentioned in the general description, instead of the inner surface 7, 241 of the annular wall being of conical form, this surface may be that of a paraboloid defined as a surface of revolution generated by a parabola revolving on its axis, this axis coinciding with the normal line of action of the applied stress. Such a portion of this parabola may be utilized as is suitable for securing a frustum form of the annular wall in which the uniform strain is developed in the manner which has been described. Where great precision is desired the paraboloid surface is preferable and may be produced in turning or forming operations in a machine tool.

Figure 13:
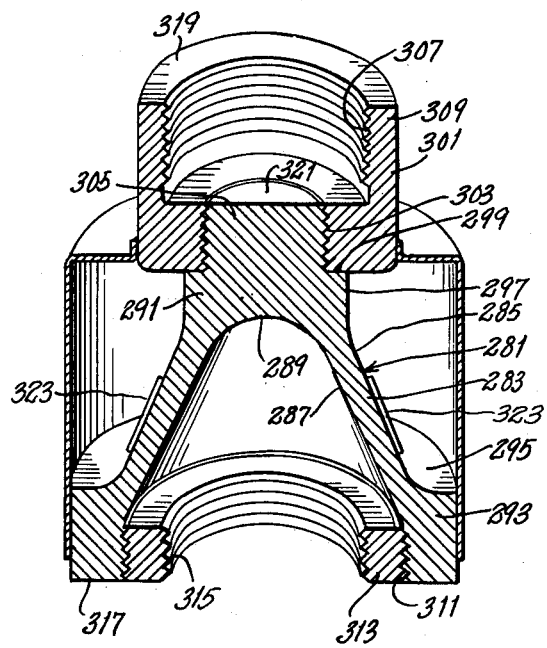
FIG. 13 shows a modified load cell similar to that of FIG. 3 but with adapter means for applying selectively tension stress or compressive stress.

In the load cell shown in FIG. 13 the strain element 281 provides an annular wall 283 having a conical outer surface 285 and a conical inner surface 287 the linear elements of which are connected by the arcuate or spherical surface 289 which forms the lower surface of the upper stress applying portion 291 which is integral with the annular wall 283. This annular wall also is integral with the lower stress resisting base portion 293. The outer surface 285 is connected by suitable curved surfaces to the upper surface 295 of the base 293 and to the outer cylindrical surface 297 of the upper stress applying portion 291.

The upper stress applying portion 291 is shouldered at 299 to receive the bearing of an annular nut 301 provided with internal threads 303 that engage the threaded extension 305 of the stress applying portion 291. This nut also is provided with internal threads 307 in the upper flange part 309 thereof for receiving a threaded end member of a tensile stress applying means. The base 293 of the strain element of FIG. 13 also is provided with internal threads 311 into which is screwed an annular bushing 313 having internal threads 315 for engaging a threaded member of a stress resisting structure. The tensile stress or pull exerted upon the stress applying portion 291 through the nut 301 thereby may be resisted by a pull downwardly in FIG. 13 transmitted to the base 293 through the bushing 313. The nut 301 and the bushing 313 may be of different thread sizes so as to function as adapters to fit the threads of different stress applying members and stress resisting members.

The base 293 is provided with a planar surface 317 perpendicular to the axis of the conical surfaces 285, 287 for engagement with the cooperating surface of a suitable support when this load cell is to be used for compression. The stress then may be applied to the upper annular surface 319 of the nut 301 by engagement with a suitable surface of the structure the load on which is being measured. Thus it will be apparent that the device of FIG. 13 may be used either for measurement of tensile stress or for the measurement of compressive stress without modifying the structure of the cell or its strain element. If desired, however, the nut 301 and bushing 313 may be removed and the load or stress then may be applied to the upper surface 321 of the extension 305 of the stress applying portion 291 and the compressive stress may be received by the base 293 and transmitted to a support through the surface 317.

The apex angle of the exterior conical surface of the strain element in the several embodiments described, as well as that of the inner conical surface, may be varied to suit different load conditions and means for applying the load or stress, as well as to suit different materials which may be utilized for the strain element. As an example of these angles for a load cell the strain element of which is made of steel, the apex angle of the exterior surface may be of the degree of 40°. The apex angle of the inner conical surface may vary between 40 and 55° to provide the desired uniformity of strain in the strain elements having different diametral and lengthwise dimensions for different load capacities. While these angles are indicative, it will be understood that they may be varied further and the corresponding thickness of the annular wall 5 also may be increased or decreased while preferably providing greater thickness adjacent the smaller diameter of the frustum as compared with the thickness adjacent the large diameter of the frustum.

It also will be understood that the form of the strain element and of its stress applying portion and of its stress resisting portion may be varied from those shown to suit different conditions while providing a strain element as an annular wall in the form of a tapering frustum, the stress being transmitted from the stress applying portion through the strain element to the stress resisting portion with the development of uniformly distributed strain without substantial deformation of either the stress applying portion or of the stress resisting portion which would introduce appreciable modification of the strain in the strain element in proportion to the applied stress. Thus is accomplished the purpose of the device as a stress measuring device in which the strain responsive elements or strain gauges are precisely responsive to the stress, the indicator indicating the strain and, therefore, the stress or load being measured.

The variations in the construction which have been disclosed herein and others which will be suggested to those skilled in the art may be made within the scope of the invention while retaining the features of the tapering annular wall as a frustum extending about the line of action of the stress. Broadly this wall is defined by exterior and interior tapering surfaces extending generally in the direction of the line of action from an end portion of the wall of larger dimension about this line of action to an end portion thereof of smaller dimension about the line of action, the material of the wall being continuous about the line of action at least in a plurality of planes transverse to and spaced along the line of action. The offsetting or cancelling of the Poisson effect which has been mentioned above and the uniform distribution of the strain within the annular wall which has been described, both along the line of action of the stress and about this line by virtue of the proportioning of the thickness of the wall respectively in the portion thereof of larger diameter and larger peripheral extent and in the portion of smaller diameter and smaller peripheral extent, which are secured in the strain element of the invention may be attained with other contours than those described.

Thus, within the scope of the invention the exterior surface may be that of a surface of revolution as a paraboloid about the axis of the parabola coincident with the line of action of the stress. In such case the inner surface will be that of a cone the rectilinear element of which is revolved about the axis of revolution of the parabola. Accordingly, the outer surface may be either conical or paraboloidal and the inner surface respectively paraboloidal or conical. As has been indicated, the actual form of these exterior and inner surfaces may be those which approximate the mathematical surfaces of the cone and paraboloid, having regard to the use of those portions of the parabolic curve which approach or approximate rectilinear elements. Other pyramidal surfaces than that shown may be utilized while providing the annular wall of the form described.

All such variations and modifications are intended to be within the scope of the appended claims.

I claim:

1. A stress measuring device comprising a strain element capable of resiliently developing strain therein under stress applied thereto, means for supporting said strain element to receive the stress acting along a given line and for transmitting the stress through said strain element concomitantly with developing the strain therein, said strain element providing an annular wall extending about said line of action of the stress, said wall being defined by an exterior surface tapering in the direction along said line of action from an end portion thereof of larger dimension about said line of action to an end portion thereof of smaller dimension about said line of action, the material of said wall being continuous about said line of action of least in a plurality of planes transverse to and spaced along said line of action.

2. A stress measuring device as defined in claim 1 in which the thickness of said annular wall in the portion of said strain element of larger dimension about said line of action is less than the thickness of said annular wall in the portion of said strain element of smaller dimension about said line of action.

3. A stress measuring device as defined in claim 1 which comprises stress applying means adapted to receive the stress acting along said line of action and operatively connected to said strain element for applying the stress to said strain element.

4. A stress measuring device as defined in claim 3 in which the material of said annular wall is integral with the material of said stress applying means to provide said operative connection.

5. A stress measuring device as defined in claim 1 which comprises stress resisting means operatively connected to said strain element for receiving and resisting the stress transmitted thereto through said strain element.

6. A stress measuring device as defined in claim 5 in which the material of said annular wall is integral with the material of said stress resisting means to provide said operative connection.

7. A stress measuring device comprising a strain element capable of resiliently developing strain therein under stress applied thereto, means for supporting said strain element to receive the stress acting along a given line and for transmitting the stress through said strain element concomitantly with developing the strain therein, said strain element providing an annular wall extending about said line of action of the stress, said wall being defined by an exterior surface of generally frusto conical form coaxial with said line of action of the stress and extending from an end portion of larger diameter to an end portion of smaller diameter, the material of said wall being continuous about the axis of said conical surface at least in a plurality of planes transverse to and spaced along said axis.

8. A stress measuring device as defined in claim 7 in which the inner surface of said annular wall substantially conforms to the surface of a paraboloid having its axis coincident with said axis of said conical surface.

9. A stress measuring device as defined in claim 7 in which the inner surface of said annular wall is of conical form coaxial with said line of action of the stress.

10. A stress measuring device as defined in claim 9 in which the apex angle of the cone of said inner surface is greater than the apex angle of the cone of said exterior surface to provide a greater thickness of the annular wall in the portion thereof of smaller diameter than in the portion of said wall of larger diameter.

11. A stress measuring device as defined in claim 1 in which said strain element is provided adjacent the end thereof of larger dimension about said line of action with means for engaging a base support for developing compression strain in said strain element when the stress is applied at the end thereof of smaller dimension about said line of action and is directed toward said end of larger dimension about said line of action.

12. A stress measuring device as defined in claim 1 in which said strain element at the end thereof of smaller dimension about said line of action is provided with an opening for passage therethrough of a tension member for directing stress along said line of action, said strain element at said portion thereof of smaller dimension providing an outer end surface adapted to engage in conforming relation a cooperating surface carried by said tension member for applying the stress of said tension member upon said strain element as compressive stress.

13. A stress measuring device as defined in claim 1 which comprises means provided at the respective ends of said strain element for engaging means for applying tension stress to said strain element.

14. A stress measuring device comprising a strain element capable of developing resilient strain therein under stress acting along a given line of action and applied to said strain element, said strain element providing an annular wall extending about said line of action of the stress, said wall being defined by an exterior surface of generally conical form coaxial with said line of action and by an annular stress transmitting surface disposed transverse to said line of action at the end of said strain element of smaller diameter, stress applying means disposed adjacent said end of said strain element of smaller diameter and provided with a surface disposed transverse to said line of action in stress transmitting engagement with said transverse surface of said strain element, and stress resisting means disposed adjacent the end of said strain element of larger diameter and supporting said strain element for engagement by said stress applying means for developing strain in said strain element under compressive stress applied to said strain element at said annular transverse surface through said stress applying means.

15. A stress measuring device as defined in claim 14 in which said transverse stress transmitting surfaces are planar.

16. A stress measuring device comprising a strain element capable of developing resilient strain therein under stress acting along a given line of action and applied to said strain element, said strain element providing an annular wall extending about said line of action of the stress, said wall being defined by an exterior surface of generally conical form coaxial with said line of action and by an annular stress transmitting surface disposed transverse to said line of action at the end of said strain element of larger diameter, stress resisting means disposed adjacent said end of said strain element of larger diameter and provided with a surface disposed transverse to said line of action in stress transmitting engagement with said transverse surface of said strain element for resisting stress transmitted thereto through said strain element, and stress applying means disposed adjacent the end of said strain element of smaller diameter and operatively connected to said strain element for applying the stress to said strain element along said line of action.

17. A stress measuring device as defined in claim 16 in which said transverse stress transmitting surfaces are planar.

18. A stress measuring device comprising a stress applying means disposed for applying stress along a given line of action, a stress resisting means disposed along said line of action in spaced relation to said stress applying means for resisting the stress transmitted thereto, and a strain element capable of developing resilient strain therein under stress applied thereto and disposed between and operatively connected to said stress applying means and to said stress resisting means so as to be strained under the stress applied by said stress applying means, said strain element providing an annular wall extending about said line of action of the stress and extending along said line from an end portion thereof of larger diameter about said line of action to an end portion thereof of smaller diameter about said line of action, said wall being defined by an exterior surface of generally frusto conical form coaxial with said line of action and by an interior surface of revolution coaxial with said line of action in spaced relation to said exterior surface to form said annular wall with substantial thickness and substantially uniform thickness about said line of action in any given plane transverse to said line of action.

19. A stress measuring device as defined in claim 18 in which the material of said annular wall at the portion thereof of smaller diameter is integral with the material of said stress applying means, the material of said annular wall at said portion thereof of larger diameter being integral with the material of said stress receiving means.

20. A stress measuring device comprising a stress applying means disposed for applying stress along a given line of action, a stress resisting means disposed along said line of action in spaced relation to said stress applying means for resisting the stress transmitted thereto, and a strain element capable of developing resilient strain therein under stress applied thereto and disposed between and operatively connected to said stress applying means and to said stress resisting means so as to be strained under the stress applied by said stress applying means, said strain element providing an annular wall extending about said line of action of the stress and extending along said line from an end portion thereof of larger dimension about said line of action to an end portion thereof of smaller dimension about said line of action, said wall being defined by an exterior surface comprising a plurality of consecutively adjacent surfaces disposed about said line of action and in inclined relation thereto to form the surface of a pyramid, said wall being defined by an interior surface tapering along said line of action from the portion of said wall of larger dimension about said line of action to the portion of said wall of smaller dimension about said line of action.

21. A stress measuring device as defined in claim 1 in which said annular wall extends about a space open at the end portion thereof of larger dimension about said line of action, means closing said end in fluid confining relation to said annular wall, and means providing for flow of a fluid through said space in heat exchanging relation to said annular wall.

22. A stress measuring device as defined in claim 21 which comprises means disposed within said space and defining with the interior surface of said annular wall a fluid flow passage extending along said wall in the direction along said line of action of the stress.

23. A stress measuring device as defined in claim 22 which comprises means providing an inlet opening communicating with said flow passage adjacent the portion of said wall of larger dimension and at a given side of said line of action for conveying fluid into said passage, and an outlet opening communicating with said passage adjacent said portion of said wall of larger dimension and at the side of said line of action opposite to said inlet opening for conveying a fluid from said passage.

24. A stress measuring device as defined in claim 21 which comprises a member protruding into said space through said open end thereof and having a surface extending about said line of action of the stress in spaced generally parallel relation to the inner surface of said wall to provide between said surface of said member and said wall a fluid flow passage annular about said line of action of the stress, said member cooperating with said closing means to confine the fluid between said wall and said member, said means providing for flow of a fluid providing inlet and outlet openings communicating with said annular passage respectively at points spaced about said line of action of the stress to provide for circulation of fluid through said passage.

25. A stress measuring device as defined in claim 21 in which said closing means comprises a member extending across the larger end of the space within said annular wall, said member having a portion protruding into said space through said open end thereof and having a surface extending about said line of action of the stress in spaced generally parallel relation to the inner surface of said wall to provide between said surface of said member and said wall a fluid flow passage annular about said line of action of the stress, said member having a peripheral portion extending about said line of action and disposed for engagement with the portion of said annular wall of larger dimension, and means for holding the peripheral portion of said member in fluid confining relation to said portion of said wall of said strain element of larger dimension.

26. A stress measuring device as defined in claim 1 which comprises a heating element disposed in heat transferring relation to a surface of said annular wall, and means for controlling the heat developed in said heating element for controlling the temperature of said annular wall.

27. A stress measuring device as defined in claim 26 in which said heating element is provided by an electrical resistance and said control means comprises means for controlling the current flowing through said electrical resistance.

28. A stress measuring device as defined in claim 27 which comprises a plurality of said electrical resistances arranged in adjacent relation to each other and symmetrically about and along said surface of said annulad wall.

29. A stress measuring device as defined in claim 1 which comprises a strain responsive element disposed in strain sensing relation to said annular wall for response to the strain developed in said wall.

30. A stress measuring device as defined in claim 1 which comprises a plurality of strain responsive elements disposed in symmetrically spaced relation about said line of action of the stress and in strain sensing relation to a given surface of said annular wall.

31. A stress measuring device as defined in claim 30 in which said strain responsive elements are disposed adjacent and in strain sensing relation to the inner surface of said annular wall.

32. A strain element for a stress measuring device adapted to receive stress acting along a given line and for transmitting the stress through said strain element concomitantly with developing the strain therein, said strain element providing an annular wall extending about said line of action of the stress, said wall being defined by an exterior surface extending in the direction along said line of action from an end portion thereof of larger dimension about said line of action to an end portion thereof of smaller dimension about said line of action, the material of said wall being continuous about said line of action at least in a plurality of planes transverse to and spaced along said line of action.

33. A strain element as defined in claim 32 in which said wall is further defined by an interior surface extending in the direction along said line of action from an end portion of larger dimension about said line of action to an end portion of smaller dimension about said line of action.

34. A strain element as defined in claim 33 in which the thickness of said annular wall in the portion of said strain element of larger dimension about said line of action is less than the thickness of said annular wall in the portion of said strain element of smaller dimension about said line of action.

35. A strain element as defined in claim 33 in which at least one of said surfaces of said wall is conical and the other is a surface of revolution upon the axis of the cone and at least approximates a paraboloid.

36. A strain element as defined in claim 32 in which the material of said wall between the portions thereof disposed in said plurality of planes transverse to and spaced along said line of action is continuous in at least a plurality of portions spaced about and extending along said line of action and is integrally connected to said continuous transverse portions.

References Cited in the file of this patent
UNITED STATES PATENTS

| | | |
|---|---|---|
| 2,436,317 | Manjoine | Feb. 17, 1948 |
| 2,488,347 | Thurston | Nov. 15, 1949 |
| 2,561,318 | Ruge | July 17, 1951 |
| 2,814,946 | Harris | Dec. 3, 1957 |
| 2,867,707 | MacDonald | Jan. 6, 1959 |
| 2,992,556 | Webster | July 18, 1961 |